(12) United States Patent
Western

(10) Patent No.: US 6,980,809 B2
(45) Date of Patent: Dec. 27, 2005

(54) METHOD AND APPARATUS FOR SCHEDULING COMMUNICATION SERVICES

(75) Inventor: Gary E. Western, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 542 days.

(21) Appl. No.: 10/033,012

(22) Filed: Dec. 27, 2001

(65) Prior Publication Data

US 2003/0125038 A1 Jul. 3, 2003

(51) Int. Cl.$^7$ .............................................. H04Q 7/20
(52) U.S. Cl. .................. 455/450; 455/452.1; 455/509; 455/513; 455/226.1; 455/67.11
(58) Field of Search .............................. 455/450, 452.1, 455/452.2, 456.1, 456.2, 509, 510, 512, 513, 455/515, 226.1, 67.11, 115.1; 370/328, 329, 370/330

(56) References Cited

FOREIGN PATENT DOCUMENTS

| EP | 0 666 699 A1 | 8/1995 |
|---|---|---|
| WO | WO-00/57658 | 9/2000 |
| WO | WO-01/45445 A1 | 6/2001 |

OTHER PUBLICATIONS

International Search Report filed Nov. 11, 2002.

*Primary Examiner*—Temica Beamer

(57) ABSTRACT

Communication services are scheduled for mobile stations (116, 118) within a communication network (100) based upon characteristics of communication links (122, 124) associated with each of the mobile stations (116, 118). A group of mobile stations is formed based upon the respective characteristics, and communication services are scheduled for the group.

16 Claims, 2 Drawing Sheets

502 — DETERMINE COMMUNICATION CHARACTERISTIC FOR EACH COMMUNICATION CHANNEL

504 — FORM GROUP OF MOBILE STATIONS BASED UPON THE CHARACTERISTICS

506 — SCHEDULE COMMUNICATION SERVICES FOR THE GROUP

*500*

METHOD AND APPARATUS FOR SCHEDULING COMMUNICATION SERVICES

FIELD OF THE INVENTION

The invention relates to wireless communication networks, and more particularly to a method and apparatus for scheduling communication services, and in particular data communication services, in a wireless communication system.

BACKGROUND OF THE INVENTION

Wireless communication networks, such as cellular telephone communication networks, are commonplace. Wireless communication networks may comply with one or more standards or recommendations, such as the Global System for Mobile communication (GSM) recommendations. A system operating according to the GSM recommendations will typically include a switching system (SS), a base station system (BSS) and an operation and support system (OSS).

The base station system provides all of the radio-related functions, and the BSS typically includes one or more base station controllers (BSCs) and a plurality of base transceiver stations (BTSs). The base station controller provides all the control functions and physical links between the switching system and the base transceiver station. The base station controller is a high-capacity switch that provides functions such as handover, cell configuration, and control of radio frequency (RF) power levels in the base transceiver stations.

The BTS handles the radio interface to the mobile station (MS). The mobile station is the subscriber equipment used to access the wireless communication network. The base transceiver station includes the radio equipment (transceivers, antennas, amplifiers, etc.) needed to service each cell in the network. A group of base transceiver stations is controlled by a base station controller.

The operation and support system is the functional entity from which the network operator monitors and controls the system. The purpose of the OSS is to provide centralized, regional and localized operation and maintenance activities required for wireless communication network operation. For example, the operation and support system provides a network overview and supports maintenance activities of different operation and maintenance organizations. The operation and support system may include an operation and maintenance center (OMC) coupling all the equipment in the wireless communication network.

The switching system is responsible for performing call processing and subscriber related functions. The switching system includes: the home location register (HLR), the mobile services switching center (MSC), visitor location register (VLR), authentication center (AUC) and equipment identity register (EIR).

In General Packet Radio Service (GPRS) communication networks, for example, it may be necessary for the BTS to communicate with multiple mobile stations simultaneously. To do this, the BTS uses a single communication channel or resource that may be monitored by each MS operating in the communication network. For a GPRS communication network utilizing time division multiple access (TDMA) protocol, this single communication channel is a single block or on a single timeslot (a packet). Some of the reasons that necessitate the need to reach multiple mobile stations with a single packet include point to multipoint transfers (during which several mobile stations may be the intended recipient of a given packet, broadcast transfers (where all mobile stations in a specific geographic region need to be reached, and normal operation using Dynamic Allocation for radio resource scheduling. The European Telecommunications Standards Institute (ETSI) standards defining GPRS outline three different types of access mechanisms: Fixed Allocation, Dynamic Allocation, and Extended Dynamic Allocation.

Fixed Allocation is a mechanism by which the BSS pre-determines a schedule for each MS needing to transmit or receive data and communicates this scheduling information to each impacted MS. Periodically this information is updated to allow changes in the schedule to accommodate mobile stations that have completed transfers, new mobile stations which are waiting to transfer, and retransmission of corrupted blocks for existing transfers. This scheduling mechanism has inefficiencies. When a mobile station suddenly stops sending data without warning, the remainder of that mobile station's allocation is wasted as the scheduler cannot retract the blocks already allocated to that mobile station.

Dynamic Allocation and Extended Dynamic Allocation are mechanisms by which the GPRS network indicates to a given a mobile station that during the next occurrence of the timeslot in the uplink direction, the indicated mobile station is to transmit an uplink packet. The packet data needs of all of the mobile stations in the cell are assessed every block period and this activity is repeated. At the beginning of each resource request made by the mobile station, a code is sent to the mobile station that indicates which address (Uplink State Flag) will be used on the given timeslot for that mobile station. From this point on the mobile station must listen to the downlink packets for its Uplink State Flag value to appear. In the Dynamic Allocation cases, the GPRS network communicates with at least two mobile stations at the same time. The information indicating which mobile station has been scheduled to transmit on the next uplink block is contained in a group of bits (Uplink State Flags) in each downlink message that also contains data payload for a potentially different mobile station.

In all of the cases in which multiple mobile stations are receiving the same downlink blocks, the GPRS network must always transmit downlink blocks at a transmit level high enough to reach all intended mobile stations. This can result in a higher than necessary transmit level in the network. Transmitting with higher than necessary power increases interference within the communication network. It also increases the dynamic range with which the mobile stations must be designed to cope.

Thus, there is a need for a method and apparatus for scheduling communication services in a wireless communication network.

BRIEF DESCRIPTION OF THE DRAWINGS

The invention will be described in terms of several preferred embodiments to illustrate its broad teachings. Reference is also made to the attached drawings.

DETAILED DESCRIPTION OF THE PREFERRED EMBODIMENTS

In accordance with a preferred embodiment of the invention, a communication network provides wireless communication services, such as wireless data communication services, to a plurality of mobile stations operating within the communication network. The mobile stations and the communication network communicate using at least one, and at times several communication resources. The mobile stations are grouped into groups based upon a characteristic of an associated communication resource, and the communication services are scheduled for the group. Mobile stations are then grouped into groups wherein mobile stations within a group each have substantially alike communication resource characteristics, e.g., substantially the same path loss. The communication resource may be then adjusted to transmit to the group based upon the characteristic of the group.

For example, the characteristic of the communication resource may be path loss. Path loss for each mobile station may be estimated utilizing power control data readily available within the communication network. Transmissions to a particular group may be made at a power level appropriate to accommodate the path loss of the group. In this manner, overall transmission power is reduced, resulting in a corresponding decrease in interference. Additionally, whether a transmission is directed to a mobile station as part of its group or individually, each such transmission is at a power level that is related to the mobile station's associated path loss. Hence, the mobile station does not have to cope with large swings in power level, and hence may operate in an overall smaller dynamic range.

Figure 1:
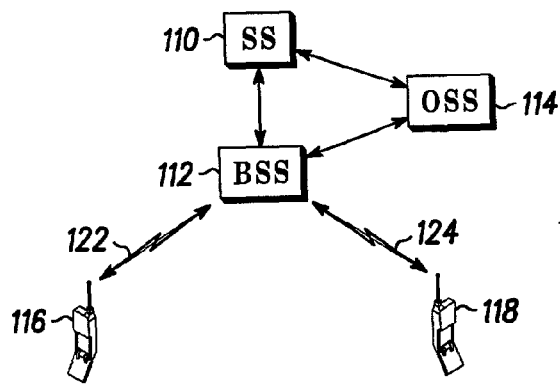
FIG. 1 is a block diagram of a communication network, such as a GPRS communication network that may be adapted in accordance with the preferred embodiments of the invention.

Referring to FIG. 1, a wireless communication network 100 includes a switching system (SS) 110, a base station system (BSS) 112 and an operations and support system (OSS) 114 for providing service to mobile stations (MS), two of which are indicated as mobile stations 116 and 118, respectively. The wireless communication network 100 provides communication services in a coverage area 120. The base station system 112 is coupled to the SS 110 and includes a base station controller coupled to a plurality of base transceiver stations (not depicted in FIG. 1). The operations and support system 114 is coupled to each of the switching system 110 and the base station system 112. As is well known, the mobile stations 116, 118 communicate with the base station system over an associated communication resource, or communication channel 122 and 124, respectively. The communication channel 122, 124 may be a frequency or frequency pair, a time slot, a spreading code or combinations thereof.

Figure 2:
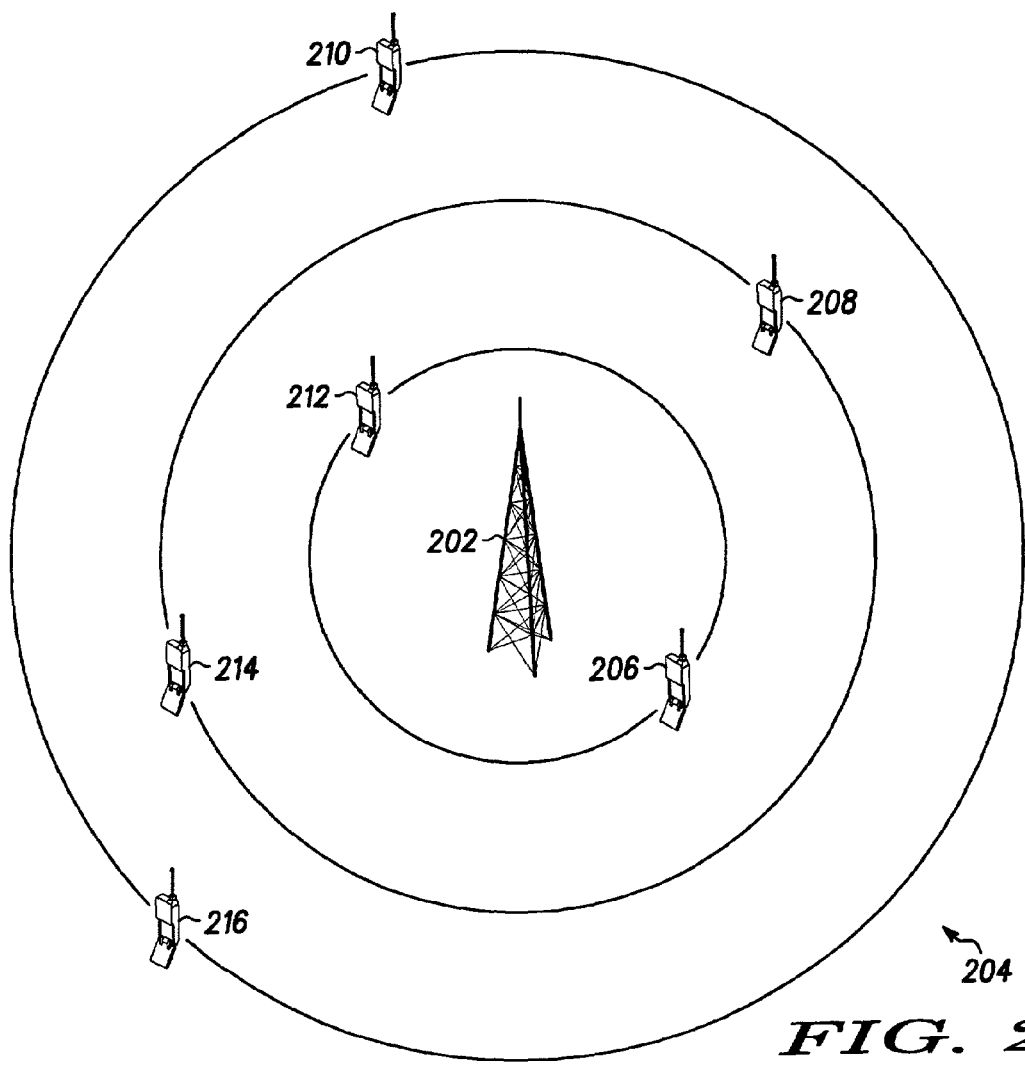
FIG. 2 is a graphical illustration of a communication cell of the communication network illustrated in FIG. 1.

Referring to FIG. 2, a base transceiver station 202 services a coverage area 204, such as a cell of a cellular communication network. A plurality of mobile stations 206–216 operates within the coverage area 204 at varying distances from the base transceiver station 202. The mobile stations 206–216 may be cellular telephones, pagers, personal digital assistants, or combinations thereof, suitable for communicating with the base transceiver station 202. Because of its physical relationship to the base transceiver station 202 (e.g., distance, position relative to one or more obstructions, position relative to one or more sources of interference), the characteristics of the communication resource coupling each mobile station 206–216 vary with respect on one another and with respect to time. These characteristics may include path loss, bit error rate, signal-to-noise ratio, and the like. Moreover, while like proximity of two mobile stations to the base transceiver station may suggest that each experiences similar communication channel characteristics, e.g., each may have approximately the same path loss, such may not necessarily be the case.

During operation within the coverage area 204, one or more of the mobile stations 206–216 may request communication services from the base transceiver station 202. For example, the mobile stations 206 and 208 may each request a number of timeslots within which data is to be communicated. In order to accommodate these requests, the base station system 202 must identify uplink timeslots for use by the requesting mobile station and communicate the available timeslot information to the requesting mobile station. The base station system 202 uses a downlink data block to communicate the time slot information to the requesting mobile station.

Figure 3:
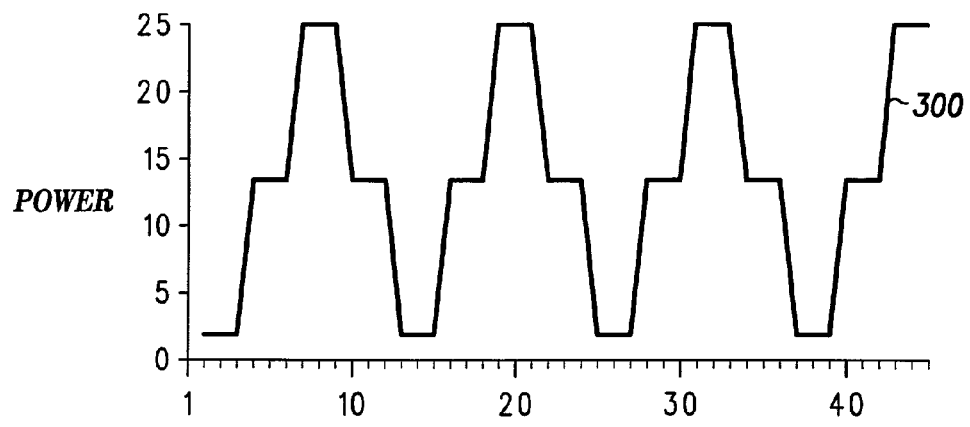
FIG. 3 is a graphical illustration of a scheduling algorithm that may be utilized to schedule communication services in the communication network illustrated in FIG. 1.

More particularly, the base station system 202 operates in accordance with a scheduling algorithm retained within a memory thereof (not depicted). According to the sheduling algorithm, the base station system 202 first schedules a mobile station with the lowest pathloss for transmission of a downlink packet. At the same time, the base station system 202 identifies a mobile station which is waiting to make an uplink data transfer and is experiencing similar path loss to the mobile station scheduled to receive the downlink packet. The base station system 202 then transmits a data block containing the downlink packet and timeslot information to both mobile stations using downlink power control sufficient to compensate for the greater of the two path loss values. Next, the BSS 202 selects the mobile station with the next higher downlink path loss with a downlink block waiting to be transmitted and identifies a mobile station waiting to make an uplink transmission that is experiencing similar pathloss. The base station system 202 again transmits a block to both mobile stations using downlink power control sufficient to compensate for the greater of the two path loss values. In this way the network continues to schedule all mobiles at which time the process repeats. The outcome is that the network always minimizes the transmit power necessary to reach both mobile stations and the dynamic range with which the mobile station receiver needs to cope is minimized. This power ramping approach to scheduling is illustrated by the graph 300 depicted in FIG. 3.

Figure 4:
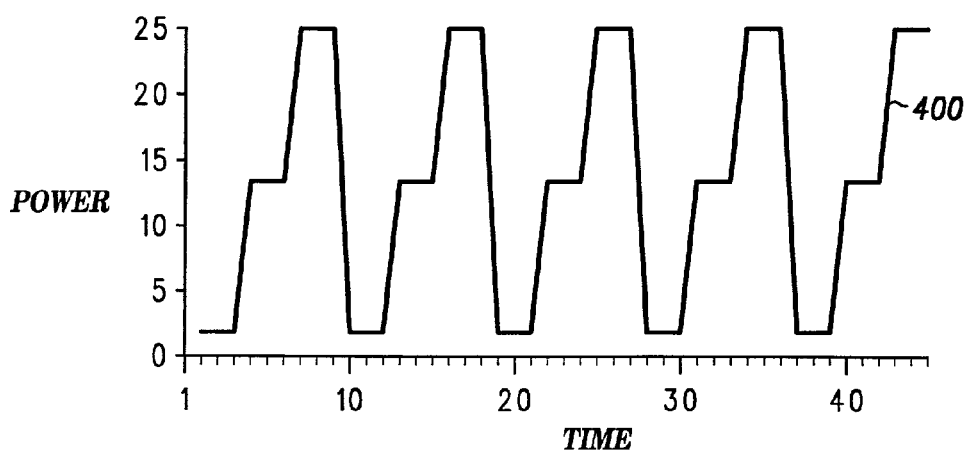
FIG. 4 is a graphical illustration of an alternate scheduling algorithm that may be utilized to schedule communication services in the communication network illustrated in FIG. 1.

While the foregoing describes one approach to scheduling based upon identifying mobile stations respectively waiting downlink and uplink transmission and having similar communication channel characteristics, there are numerous possible scheduling schemes. A second approach sinusoidaly rotates through the downlink mobile stations according to path loss. This second approach is illustrated by the graph 400 depicted in FIG. 4. A third approach may select mobile pairs according to data payload and class of service. Still other scheduling approaches wherein characteristics of the respective communication channels of a mobile station waiting a downlink communication and a mobile station waiting uplink transmission instructions are matched in order to facilitate communication of both the downlink packet and the uplink timeslot information may be envisioned.

Figure 5:
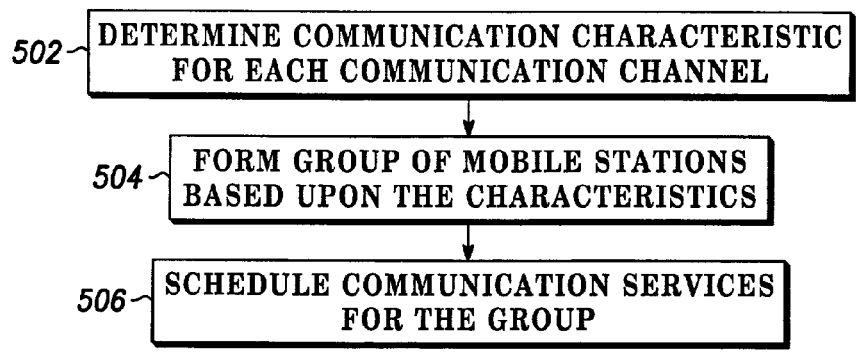
FIG. 5 is a flow chart illustrating a method for scheduling communication services in accordance with the preferred embodiments of the invention.

Referring to FIG. 5, a method 500 for scheduling communication services within a communication network, begins at step 502 where for each mobile station a characteristic of an associated communication link is determined. Next, at step 504, a group of mobile stations is formed based upon the characteristics. For example, the characteristic may be path loss, power control, bit error rate, signal-to-noise ratio. Alternatively, the characteristic may relate to the packet payload or service type. The group may be a pair of mobile stations wherein one mobile station of the pair is waiting to receive a downlink transmission and the other mobile station of the pair is waiting to send an uplink transmission. The group may also be based upon the characteristic being substantially alike, as in the case where the characteristic is path loss, or may the group may be based upon the characteristic being diverse. Once the group is formed, at step 506, communication services are scheduled for the group. For example, a data block may be transmitted to each mobile station within the group. The data block may contain data for one or more mobile stations in the group and/or contain uplink transmission information for other mobile stations in the group.

Referring once again to FIG. 2 and with continued reference to FIG. 5, aspects of the invention are further illustrated through the following iterative example. Mobile station 212 receives a downlink packet transmitted by the communication network via the base transceiver station 202. At the same time, the communication network determines that mobile station 206 experiences similar path loss to mobile station 212, and indicates within the downlink data packet to the mobile station 206 that it is going to be the next transmitter on the uplink the next time that this frame is repeated. The notification may takes place as a field of bits in the downlink message sent to mobile station 212. Next, mobile station 214 receives a downlink data packet from the communication network. The communication network and at the same time indicates to mobile station 208 that it is going to be the next transmitter on the uplink the next time that this frame is repeated. Mobile station 216 then receives a downlink data packet from the communication network. The communication network at the same time indicates to mobile station 210 that it is going to be the next transmitter on the uplink the next time that this frame is repeated. 214 then receives a downlink data packet from the communication network. The communication network at the same time indicates to 208 that it is going to be the next transmitter on the uplink the next time that this frame is repeated. Mobile station 212 then receives a downlink data packet from the communication network. The communication network at the same time indicates to mobile station 206 that it is going to be the next transmitter on the uplink the next time that this frame is repeated.

The invention has been described in terms of several preferred embodiments. The invention may be otherwise embodiment without departing from the fair scope and spirit of the invention as set out in the subjoined claims.

I claim:

1. In a communication network operable to provide communication services to a plurality of mobile stations operating within the communication network, each mobile station being in communication with the communication network via an associated communication link, a method for scheduling the communication services comprising:
   determining a characteristic of the associated communication link; for each mobile station;
   forming a group of mobile stations from the plurality of mobile stations based upon the characteristic of the associated communication link; and
   scheduling communication services collectively for the group of mobile stations.

2. The method of claim 1, wherein the characteristic of the associated communication link comprises at least one of: path loss, power control setting, bit error rate, and delay.

3. The method of claim 1, wherein forming a group of mobile stations comprises forming a plurality of groups of mobile stations, and wherein scheduling communication services collectively for the group of mobile stations comprises scheduling communication services collectively for each group of the plurality of groups of mobile stations.

4. The method of claim 1, wherein the group of mobile stations comprises mobile stations having communication links with similar characteristics.

5. The method of claim 1, wherein scheduling communication services collectively for the group of mobile stations comprises scheduling communication services on a recurring basis.

6. The method of claim 1, wherein scheduling communication services collectively for the group of mobile stations comprises scheduling communication services on a sinusoidal basis.

7. The method of claim 1, wherein determining a characteristic of the associated communication link for each mobile station comprises determining a power control state.

8. The method of claim 1, wherein scheduling communication services collectively for the group of mobile stations comprises transmitting schedule information to the group of mobile stations.

9. The method of claim 1, wherein scheduling communication services collectively for the group of mobile stations comprises scheduling communication services for the group of mobile stations to minimize the transmit power needed to reach each mobile station of the group of mobile stations.

10. The method of claim 1, wherein the group of mobile stations comprises a first mobile station to receive a downlink transmission and a second mobile station to request an uplink timeslot.

11. An apparatus for scheduling communication services within a communication network, the communication network providing communication services to a plurality of mobile stations operating within the communication network, the apparatus comprising:
   a base station system operable to establish communication links between the communication network and each of the plurality of mobile stations, the base station system being further operable to determine a characteristic of each of the communication links;
   a scheduling algorithm operating in accordance with the base station system to form a group of mobile stations from the plurality of mobile stations based upon the characteristic of each of the communication links and to schedule communication services collectively for the group of mobile stations.

12. The apparatus of claim 11, wherein the characteristic of each of the communication links comprises at least one of path loss, power control setting, bit error rate, and delay.

13. The apparatus of claim 11, wherein the base station system operates in accordance with the scheduling algorithm to form a plurality of groups of mobile stations and to schedule communication services for the plurality of groups of mobile stations.

14. The apparatus of claim 11, wherein the group of mobile stations comprises mobile stations having communication links with similar characteristics.

15. The apparatus of claim 11, wherein the scheduling algorithm comprises a recurring scheduling algorithm.

16. The apparatus of claim 11, wherein the scheduling algorithm comprises a sinusoidal scheduling algorithm.

* * * * *